US005710552A

United States Patent [19]
McCoy et al.

[11] Patent Number: 5,710,552
[45] Date of Patent: Jan. 20, 1998

[54] BARRIER DEVICE

[75] Inventors: Steven J. McCoy, Eden Prairie; Mark S. Schumacher, Minneapolis; John A. Kielb, Eden Prairie; Donald F. Palan, Chaska; Grant B. Edwards, Blaine; Randy J. Longsdorf, Chaska; James E. Templin, Burnsville, all of Minn.

[73] Assignee: Rosemount Inc., Eden Prairie, Minn.

[21] Appl. No.: 472,695

[22] Filed: Jun. 6, 1995

Related U.S. Application Data

[63] Continuation-in-part of Ser. No. 316,059, Sep. 30, 1994, abandoned.

[51] Int. Cl.$^6$ .................................................. G08C 19/16
[52] U.S. Cl. .......................... 340/870.21; 340/870.39; 340/660; 340/662; 340/664
[58] Field of Search .................. 340/870.3, 87.39, 340/870.16, 870.17, 870.21, 660, 661, 662, 664; 361/18, 54, 57, 58; 73/4 R, 753, 866.5

[56] References Cited

U.S. PATENT DOCUMENTS

| | | | |
|---|---|---|---|
| 3,573,774 | 4/1971 | Olsen | 340/870.35 |
| 3,614,539 | 10/1971 | Hallenbeck | 317/99 |
| 3,959,786 | 5/1976 | Chana et al. | 340/870.39 |
| 4,015,472 | 4/1977 | Herzl | 73/861.22 |
| 4,190,822 | 2/1980 | Swarbrick | 340/210 |
| 4,290,297 | 9/1981 | Anderson | 73/1 R |
| 4,403,297 | 9/1983 | Tivy | 364/579 |
| 4,412,265 | 10/1983 | Buuck | 361/18 |

(List continued on next page.)

FOREIGN PATENT DOCUMENTS

| | | |
|---|---|---|
| 0122777 | 10/1984 | European Pat. Off. |
| 0 322 281 A1 | 6/1989 | European Pat. Off. |
| 2023624 | 12/1970 | Germany |
| 2218214 | 11/1989 | United Kingdom |

OTHER PUBLICATIONS

Von J. Martens, "Sicherheitsbarrieren", *Regelungstechnische Praxis Und Prozess–Rechentechnik*, vol. 13, No. 6, Dec. 1971, pp. 211–214.

Catalog: "Applying Intrinsic Safety—Wiring Examples", *Intrinsic Safety Catalog*, Pepperl+Fuchs, 1990, pp. 38–39 and 59.

Catalog: "Mini–Tee™ Connectors", *Quick–Disconnect Systems for Simplified Management of Control System Wiring*, Daniel Woodhead Company (undated), p. 26.

"Safety Barrier Serves Transmitters", I. Hutcheon, *Control & Instrumentation*, vol. 19, No. 11, pp. 79, 81, Nov. 1987.

*Primary Examiner*—Jeffery Hofsass
*Assistant Examiner*—Ashok Mannava
*Attorney, Agent, or Firm*—Westman, Champlin & Kelly, P.A.; S. Koehler

[57] ABSTRACT

A barrier device threadably mounts to a cabling aperture on a field mounted transmitter. The field mounted transmitter receives and transmits signals, and is wholly powered by a current loop circuit. The barrier device has a conductive housing with at least a first and a second aperture and a pair of conductors passing through the first aperture of the barrier device, for connecting to a terminal block in the transmitter. A pair of signal terminals, preferably as ring tongue lug, is mounted in the second aperture of the barrier device. The signal terminals are connectable to a handheld communicator, which is used to calibrate, monitor and test the transmitter. A barrier circuit is mounted in the housing and is electrically connected between the signal terminals and the conductors. Signals from the communicator access the terminal block through the barrier circuit, and the barrier circuit limits the power available at the signal terminals. One embodiment of the barrier device has a third aperture directly across from the first aperture. The first aperture threadably connects to the transmitter, so that cabling from the transmitter can pass through a passageway formed between the first and third apertures. Another embodiment has a stub shaped housing, with one end of stub being the first aperture, and the other end being the second aperture. The first aperture threads to the cabling aperture on the transmitter, and the barrier circuit is potted in the stub shaped housing.

20 Claims, 9 Drawing Sheets

U.S. PATENT DOCUMENTS

| | | | |
|---|---|---|---|
| 4,573,040 | 2/1986 | Maltby et al. | 340/511 |
| 4,589,077 | 5/1986 | Pope | 364/509 |
| 4,806,905 | 2/1989 | McGowan et al. | 340/310 R |
| 4,967,302 | 10/1990 | Hutcheon et al. | 361/1 |
| 5,028,746 | 7/1991 | Petrich | 191/12.2 R |
| 5,069,072 | 12/1991 | Taylor et al. | 73/756 |
| 5,136,630 | 8/1992 | Breneman et al. | 379/64 |
| 5,207,101 | 5/1993 | Haynes | 73/597 |
| 5,319,973 | 6/1994 | Crayton et al. | 73/290 V |
| 5,333,114 | 7/1994 | Warrior et al. | 364/550 |
| 5,363,093 | 11/1994 | Williams et al. | 340/605 |
| 5,420,578 | 5/1995 | O'Brien et al. | 340/870.13 |
| 5,502,659 | 3/1996 | Braster et al. | 364/571.01 |
| 5,546,804 | 8/1996 | Johnson et al. | 73/431 |

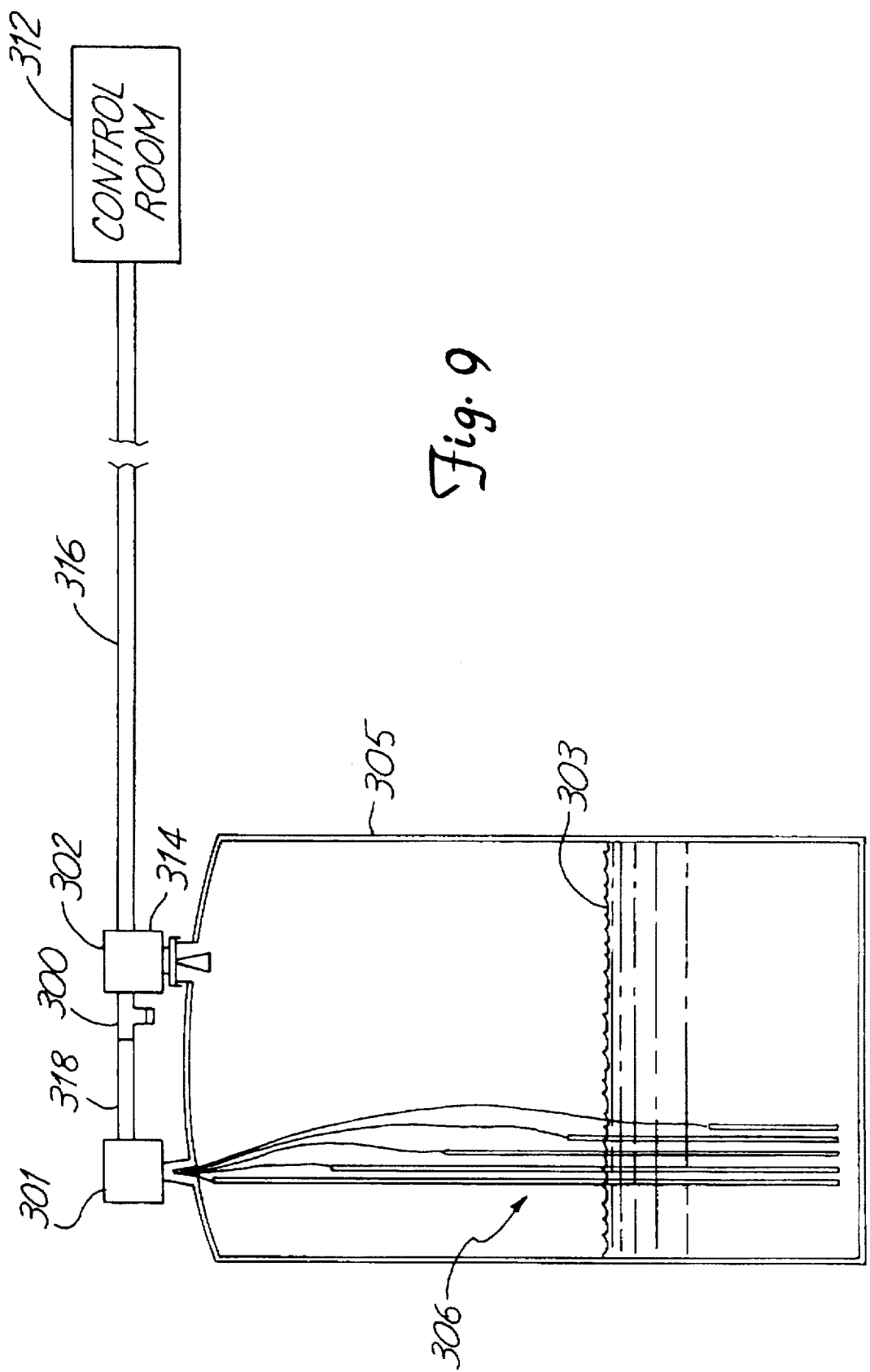

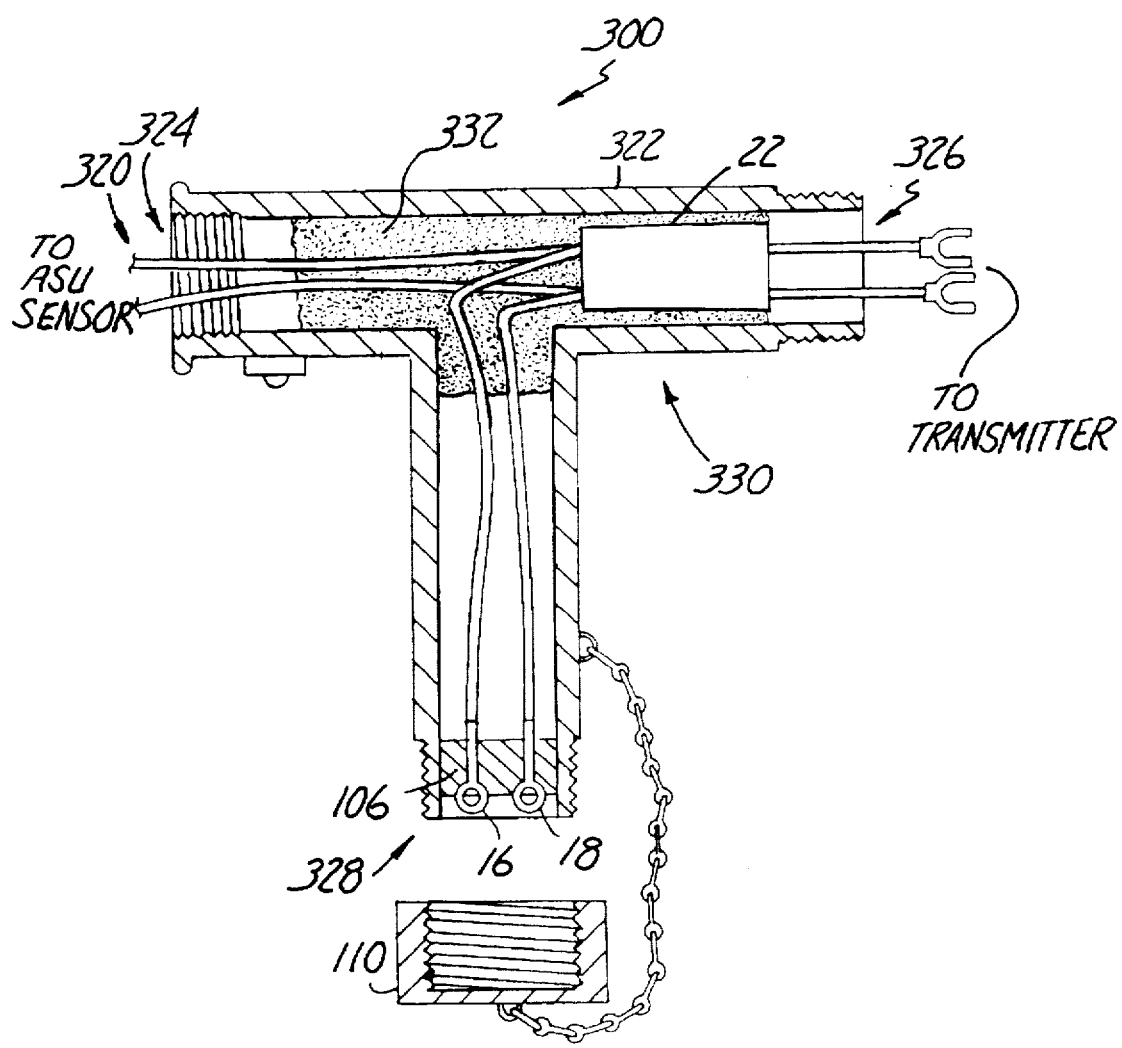

5,710,552

BARRIER DEVICE

CROSS REFERENCE TO RELATED APPLICATION

This application is a continuation-in-part of application Ser. No. 08/316,059, filed Sep. 30, 1994 now abandoned.

A portion of the disclosure of this patent document contains material which is subject to copyright protection. The copyright owner has no objection to the facsimiles reproduction by anyone of the patent document or the patent disclosure, as it appears in the Patent and Trademark Office patent file or records, but otherwise reserves all copyright rights whatsoever.

BACKGROUND OF THE INVENTION

The present invention relates to a barrier device for a field mounted measurement transmitter sensing a process variable representative of a process. More particularly, the present invention is a barrier device that mounts near the transmitter to allow electrical access to a terminal block located therein.

Transmitters sense a process variable, such as pressure, temperature and flow, which is representative of a process and provide an output representative of the process variable over a current loop to a controller. Transmitters are mounted in the field in a process control application, and as such are subjected to environmental extremes including caustic and hazardous atmospheres. Transmitters mount to a process connection at a selected point of interest in the field to sense the process variable at the selected location. A lengthy run of cabling connects the transmitter to a controller in a remote control room and forms the two wire current loop circuit, which communicates all signals to and from the transmitter and also wholly powers the transmitter. A piece of conduit threads into a cabling aperture on the transmitter and the cabling is carried in the hollow conduit to the controller, where the cabling is typically connected to the controller through a barrier circuit. Inside the transmitter, the cabling is connected to a suitable terminal block and the signals are processed by appropriate transmitter electronics.

Besides connecting the transmitter to the cabling, terminals on a terminal block in the transmitter are periodically connected to a handheld communicator for periodic test or recalibration purposes. When it is inconvenient or unsafe for a user in the field to connect the calibrator to the transmitter, the user must go to the remote control room and connect a handheld communicator to the two wire circuit in order to remotely diagnose, reconfigure and recalibrate the transmitter. It is both inconvenient and expensive to diagnose and investigate problems exclusively from a remote control room. While it is possible to remove the transmitter cover and diagnose/recalibrate the transmitter in the field where the transmitter is open to the elements, the possibility of sparking and arcing compromises reliable transmitter operation.

A field mounted device is needed which allows a user to safely connect a handheld communicator to terminals within a field mounted transmitter, but which limits the available power at the device to ensure reliable transmitter operation.

SUMMARY OF THE INVENTION

A barrier device for mounting in the field to a transmitter includes a housing with a first and a second aperture. A pair of conductors pass through the first aperture, for connecting to a terminal block in a transmitter. A pair of signal terminals is mounted in the second aperture. The signal terminals are connectable to a handheld communicator in the field. The barrier device further includes a barrier circuit mounted in the housing and electrically connected between the signal terminals and the conductors. The barrier circuit allows frequency encoded signals from the communicator to access the terminal block and limits the power available at the signal terminals.

In a preferred embodiment, the barrier device threads into a cabling aperture on a field mounted transmitter. The field mounted transmitter receives and transmits signals, and is wholly powered by a current loop circuit. The barrier device has a conductive housing with a first and a second aperture. The barrier device also has a pair of conductors which pass through the first aperture of the barrier device, for connecting to a terminal block in the transmitter. A pair of signal terminals is mounted in the second aperture of the barrier device. The signal terminals are connectable to a handheld communicator, which is used to calibrate, monitor and test the transmitter. A barrier circuit is mounted in the housing and is electrically connected between the signal terminals and the conductors. The barrier circuit allows signals from the communicator to access terminals in the terminal block and limits the power available at the signal terminals. Although other barrier circuits could be used, one of the two conductors in a preferred barrier circuit is grounded to the housing and the other conductor has a current limiting resistor in series. Three sets of two back-to-back zener diodes, the anode of one diode of a set connected to the anode of the other in a set, are connected between one end of the current limiting resistor and the ground connection to limit the current from the signal terminals and the voltage difference between the terminals.

In another embodiment, the barrier device has a third aperture directly across from the first aperture. The first aperture threadably connects to the transmitter and a passageway is formed in the housing which extends between the first and third apertures, so that the passageway carries cabling from the transmitter through to the third aperture. The housing has an elongated section ending in the second aperture where the barrier circuit is potted. The inner surface of the elongated section has grooves in it to secure the potting. In yet another embodiment of the invention, the housing is stub shaped and one end of stub is the first aperture, and the other end is the second aperture. The first aperture has threads which are adapted to thread to the cabling aperture on the transmitter, and the barrier circuit is potted in the stub shaped housing.

In another aspect of the invention, a field mountable measurement transmitter is disclosed for sensing a level of a fluid in a tank and providing power to and communicating with a temperature sensor sensing a temperature of the fluid in the tank. The measurement transmitter includes a housing and a measurement circuit mounted in the housing for measuring the level of the fluid. A first output circuit powers the temperature sensor and receives a sensor signal representative of the temperature of the fluid. A microprocessor is coupled to the measurement circuit and receives a first signal representative of the level of the fluid. The microprocessor is further coupled to the output circuit for receiving the sensor signal. The microprocessor calculates a value of a selected parameter of the fluid as a function of a value of the first signal and a value of the sensor signal. A second output circuit is coupled to the microprocessor and transmits an output signal representative of the value of the selected parameter.

In a preferred embodiment of this aspect of the present invention, a barrier device is mounted to the housing. The barrier device includes a second housing with a first and a second aperture. A pair of conductors pass through the first aperture and connect to the first output circuit. The second housing further includes a third aperture directly across from the first aperture. A pair of signal terminals is mounted in the second aperture. The signal terminals are connectable to a handheld communicator in the field. A pair of signal lines extend out the third aperture to the temperature sensor. A barrier circuit is mounted in the second housing and is electrically connected between the signal terminals and the conductors, and is electrically connected between the pair of signal lines and the conductors. The barrier circuit allows frequency encoded signals from the communicator to access the output circuit and limits the power available at the signal terminals and through the pair of signal lines.

BRIEF DESCRIPTION OF THE DRAWINGS

FIG. 9 is a perspective view of a fourth embodiment of the present invention used on a microwave level detecting system;

FIG. 11 is a sectional view of a portion of the fourth embodiment.

DETAILED DESCRIPTION OF THE PREFERRED EMBODIMENTS

Figure 1:
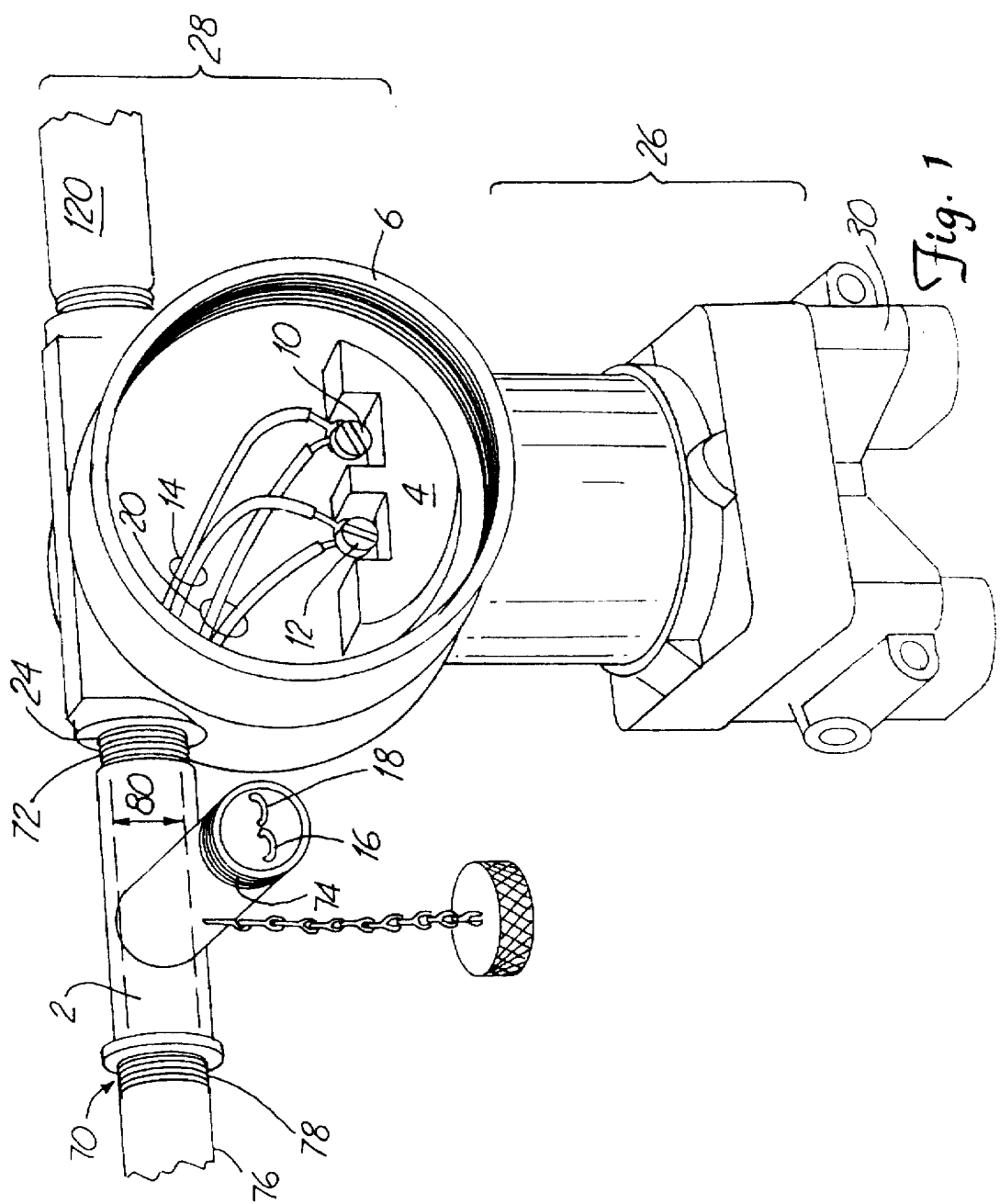
FIG. 1 is a perspective view of a first embodiment of the present invention.
Figure 2:
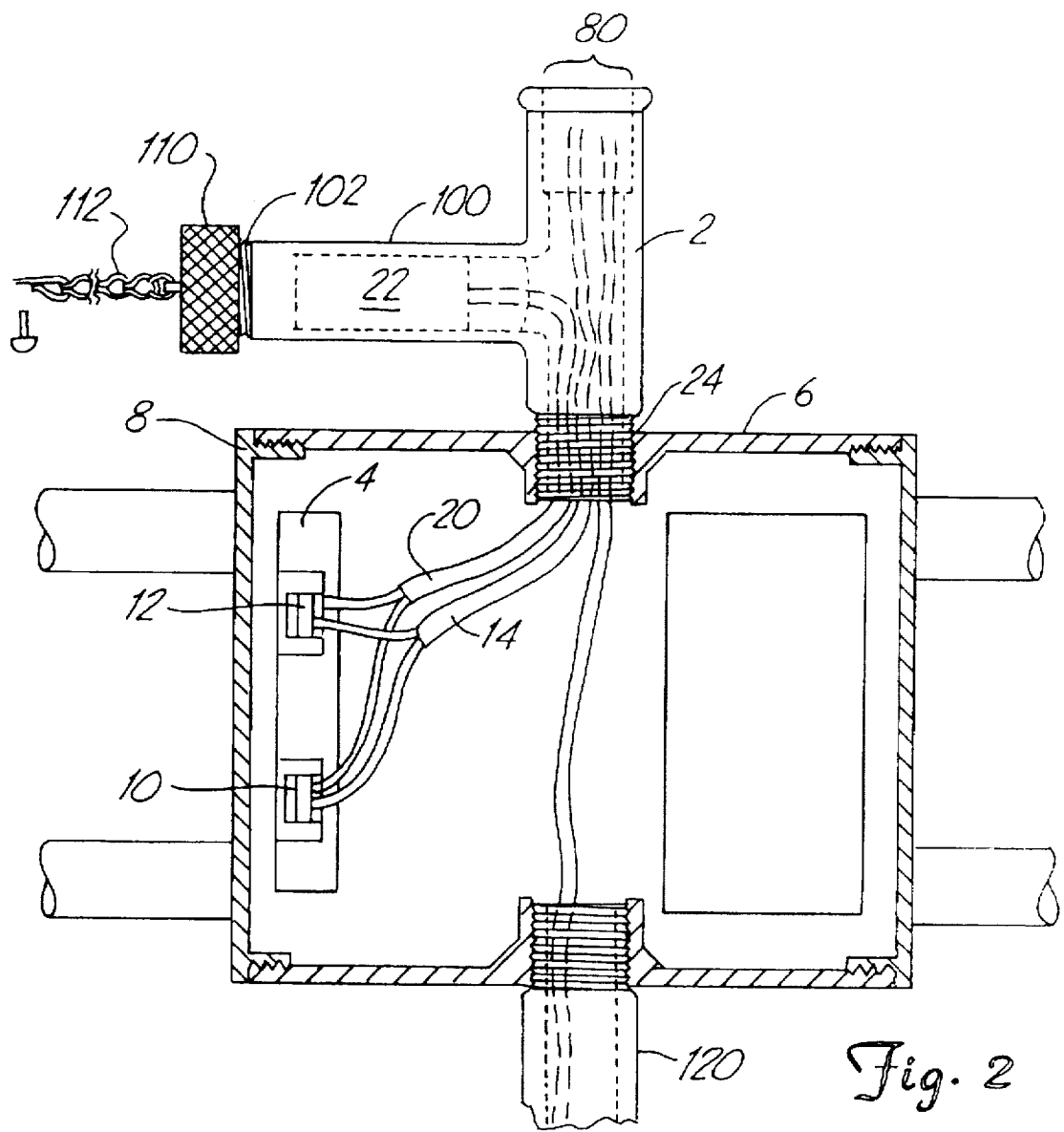
FIG. 2 is a modified sectional view of the first embodiment, showing some electrical components in a blocked format, with a corresponding transmitter illustrated in section.

FIGS. 1 and 2 show a first embodiment of a barrier device 2. Barrier device 2 provides convenient electrical access to terminals 10,12 of a terminal block 4 located within a pressure transmitter 6 while limiting power to signal terminals 16,18 but without removing a cover 8 of transmitter 6. Specifically, terminal block 4 includes terminals 10, 12 that connect transmitter 6 to a two-wire loop comprising two wire cabling 14. Cabling 14 transmits power and instructions to transmitter 6 from a controller in a remote control room location as well as carrying the signal representing the pressure back to the controller. Conductors 20 of barrier device 2 are routed through a cabling aperture 24 of transmitter 6 and connected to terminals 10,12 of the transmitter. A handheld communicator test device, not shown, connected to the signal terminals 16, 18 provides test signals to terminals 10, 12 in order to test, monitor, calibrate and configure transmitter 6.

Barrier device 2 has a hollow T-shaped conduit housing having three threaded ends indicated at 70, 72 and 74. Barrier device 2 screws to conduit 76 (eventually connected to the controller in the remote control room) and to transmitter 6. Inwardly facing threads on end 70 threadably mate with outwardly facing threads on an end 78 of conduit 76. Similarly, outwardly facing threads on end 72 threadably mate with threads provided about cabling aperture 24 of transmitter 6. An internal pathway or channel 80 formed within barrier device 2 extends between ends 70 and 72, and allows cabling 14 to pass through barrier device 2 on its way to the controller.

Pressure transmitter 6 is of a standard design, and includes a sensor module housing 26, and an electronic assembly housing 28. Electronic housing 28 screws down over sensor module 26 with suitable seals, so that the interior of transmitter 6 is closed to the environment when cover 8 is also in place. In use, sensor module housing 26 includes a pressure sensor, not shown. The sensor fluidly communicates through a flange 30 to two process lines each filled with pressurized fluid. In the embodiment illustrated, transmitter 6 is a differential pressure transmitter since the sensor senses the difference between the pressure in the two lines. Other types of field mounted transmitters such as ones which sense and transmit signals representative of temperature, flow, pH, level and other process variables are also appropriate for use with the present invention.

Figure 3:
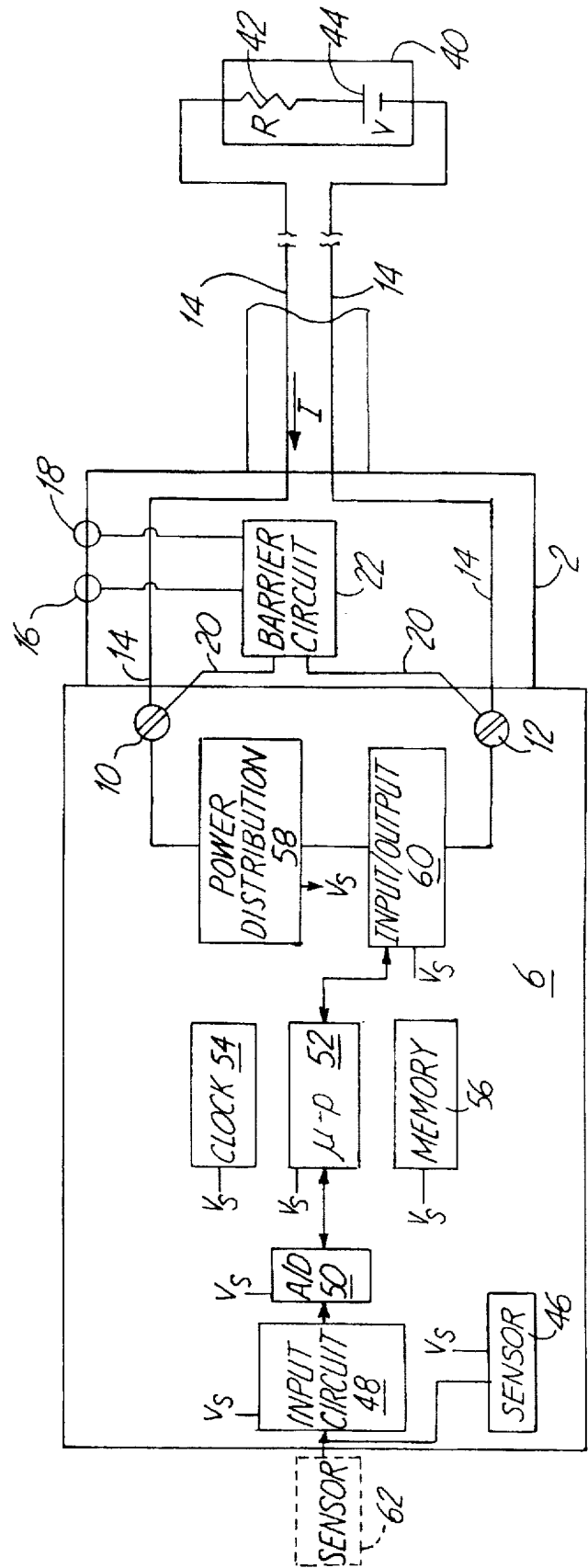
FIG. 3 is an electrical block drawing of a barrier device of the present invention connected between a transmitter and a controller.

FIG. 3 shows barrier device 2 connected between transmitter 6 and a control system 40. Control system 40 is modelled by a resistance 42 in series with a voltage source 44 and communicates with transmitter 6 over the current loop formed by cabling 14. Transmitter 6 is wholly powered by the two wire current loop. Transmitter 6 includes a sensor 46, an input circuit 48, an A/D converter 50, a microprocessor 52, a clock 54, memory 56, a power distribution circuit 58 and an input/output circuit 60. Sensor 46 senses the differential pressure between the two pressurized process lines and provides a sensed signal representative of the process variable to input circuit 48. Input circuit 48 is a signal conditioning circuit, such as a buffer, level shifter or an amplifier, and provides a conditioned output signal to A/D converter 50. A/D converter 50 converts the conditioned output signal to a digital signal according to known techniques. Clock 54 provides timing signals to microprocessor 52. Memory 56 provides program instructions and information which are accessed by microprocessor 52 during operation of transmitter 6.

Microprocessor 52 compensates the digitized sensor signal from A/D converter 50 for known repeatable errors in sensor 46 and provides a compensated output to I/O circuitry 60. In a preferred embodiment, I/O circuitry 60 outputs a 4-20 mA current onto loop 14 as a function of the compensated output. Alternatively, circuit 60 couples a digital signal representative of the compensated output onto loop 14. The digital signal may be superimposed on the analog current output mentioned above. In other modes, output circuit 60 couples frequency encoded signals, such as those encoded according to the HART® protocol, which are responsive to test, monitor and calibration commands to the two-wire loop. One example of the handheld communicator is a Rosemount® 268 HandHeld Communicator, but other units with or encoding schemes may also be used, as appropriate.

Figure 4:
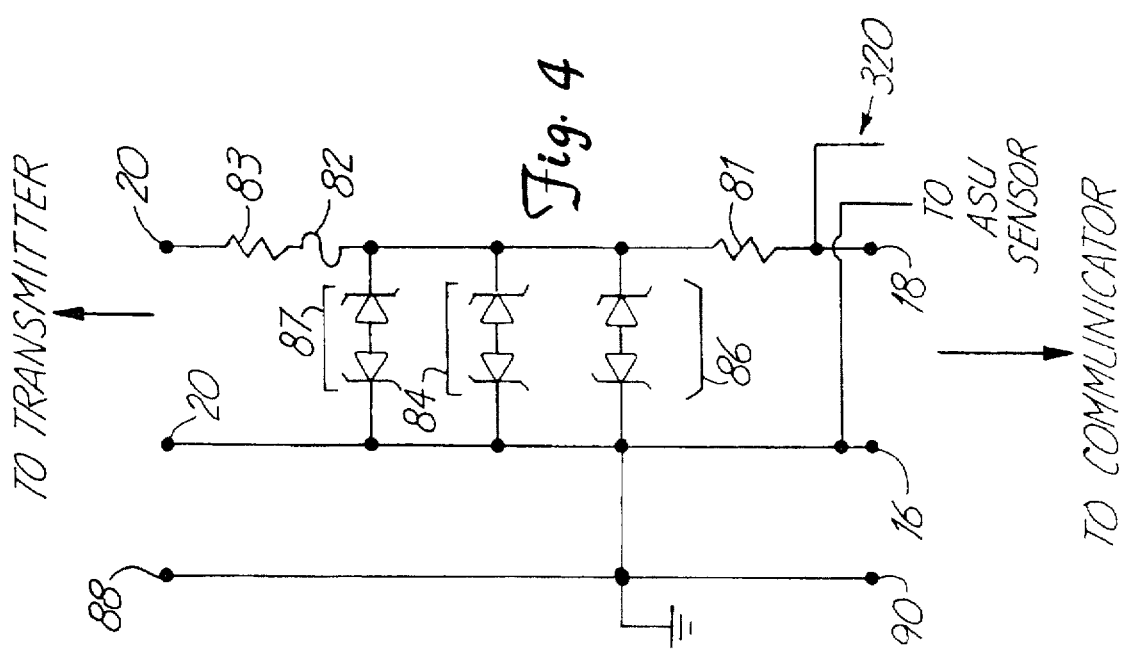
FIG. 4 is an electrical schematic view of a barrier circuit in the present invention.

Power distribution circuit 58 provides a regulated voltage output for powering the remainder of the circuitry in transmitter 6. Power distribution circuit 58 is energized by loop 14 through connectors at terminals 10 and 12. In differential pressure transmitters, sensor 46 is inside the transmitter housing. In flow transmitters and many temperature transmitters, the sensor is outside the transmitter housing as illustrated at dashed box 62. Although illustrated as connected to a pressure transmitter, it is to be understood that the barrier device 2, and other embodiments of the present invention are also well suited to provide proximate, easily accessible terminals for any other type of transmitter such as a temperature, level or flow transmitter. Barrier circuit 22 is schematically illustrated in FIG. 4. In order to limit power available at signal terminals 16,18, which are exposed to atmosphere when a field mounted 25 transmitter is uncapped, the magnitude of current through terminals 16,18 and the voltage difference across the terminals must be limited. Various worldwide safety approval agencies, such as CENELEC, FM and CSA mandate maximum voltage and current levels present in the potentially hazardous atmospheres which can sometimes be present in the field. One of the two conductors 20 is connected to the conductive housing of barrier device 2, as shown at terminals 88,90, and from the housing to ground connection 85. The other of the two conductors 20 connects to the series combination of a ¹⁄₁₆ amp fuse 82 and a 12 ohm resistor 83 for rating the fuse breaking capacity. The rating of fuse 82 is selected to limit current to the zeners, so that the zeners may be selected to have a lower power rating. The fuse and its associated resistor are connected on the ungrounded side of barrier circuit 22. Three sets of two zener diodes 84, 86 and 87, each set having the anodes of the diodes connected together, connect between the grounded and the ungrounded side of barrier circuit 22, to limit the effective potential difference between signal terminals 16,18. The second and third zener diode set 86,87 connects in parallel with zener diode 84 for redundancy in the event zener diode set 84 fails. It is preferable to use the back-to-back zener diode arrangement over a single zener diode, since the fuse will not be shorted if terminals 20 are improperly connected to the transmitter terminals 10,12. It is preferable that the zener have a reverse breakdown voltage of about 28 V. A current limiting resistor 81, having a resistance of approximately 300 ohms and a power rating of 5 watts, is connected between the ungrounded side of the zener pairs and terminal 18. The resistance is selected to be approximately the same resistance as the input resistance of a Rosemount® 268 Hand-Held Communicator, so that the input voltage requirements of the Rosemount handheld unit is satisfied. The resistance is also selected to limit the current available at terminals 16,18 for intrinsically safe systems. With a barrier circuit constructed of these components, the potential difference between terminals 16 and 18 will remain less than approximately 31V and the current out of terminals 16,18 remains less than 103 mA, even when the input to barrier circuit 22 is as high as 250V and 4000 A. Even though two wire transmitters are designed for various loop supply voltages ranging between 12V and 55V, intrinsic safety requirements mandated by the approval agencies require that barrier circuits limit power at terminals 16 and 18 when 250V and 4000 A are applied at the input to the barrier circuit. The presently described preferred circuit is 25 applicable to all embodiments of the present barrier device. Limiting the potential power at signal terminals 16,18 reduces the chances of a spark occurring which may interfere with operation of the transmitter 6. Since barrier device 2 provides only signal terminals 16,18 that a technician may need to test or recalibrate transmitter 6, misconnection of test leads to transmitter 6 is also minimized.

Figure 5:
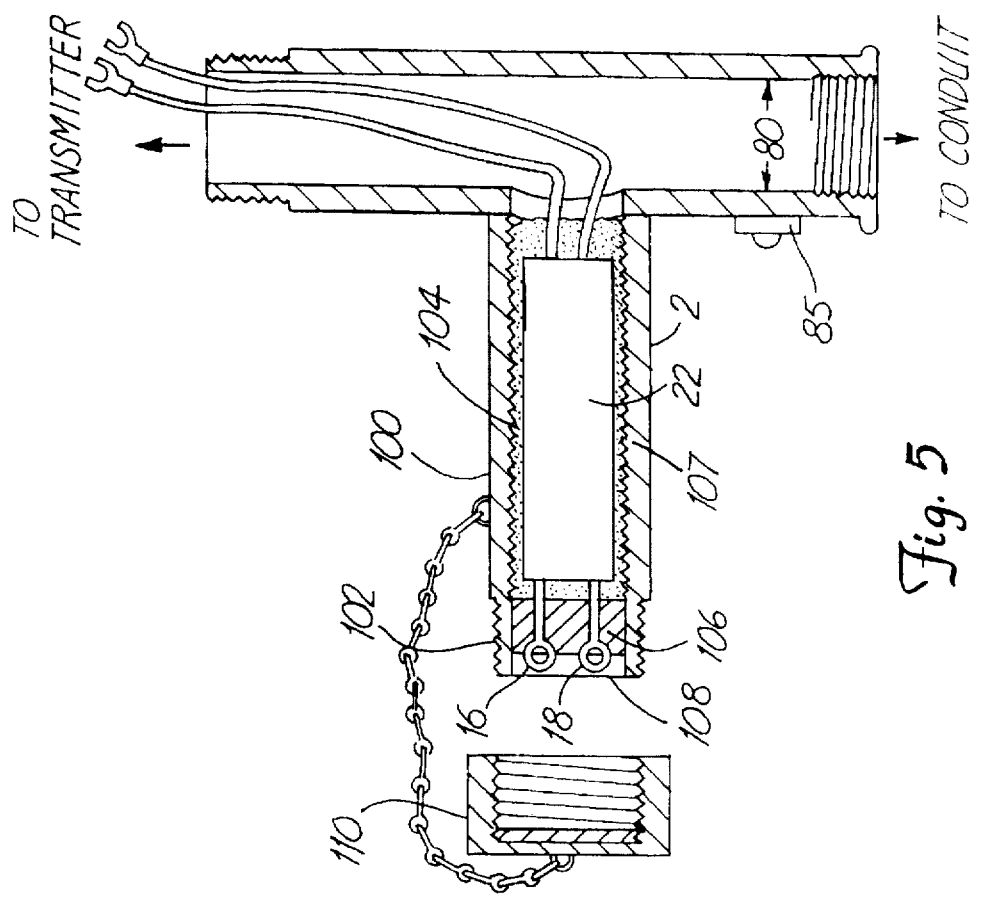
FIG. 5 is a sectional view of a portion of the first embodiment.

In FIG. 5, barrier circuit 22 mounts within an extended portion 100 of barrier device 2 between channel 80 and an end 102. A suitable potting material 104 secures barrier circuit 22 within portion 100. Grooves 107 in extended portion 100 also help to retain the potting in extended portion 100 of barrier device 2. Signal terminals 16,18 are preferably ring tongue lug members that partially extend through an insulating material 106 which seals end 102. Signal terminals 16,18 penetrate through insulation material 106 so as to project beyond and be accessible on an outer surface 108. The ring members provide convenient fastening points for test leads from the handheld communication device, not shown. Other forms of conventional terminal ends could be used other than the ring members illustrated. Signal terminals 16,18 are preferably recessed within end 102, so as to protect ring members from the surrounding environment. A removable cap 110 is secured to end 102 with suitable mating threads. A chain 112 having a first end connected to cover 110 and a second end connected to barrier device 2 (FIG. 2) prevents loss of cover 110 upon removal.

Figure 6:
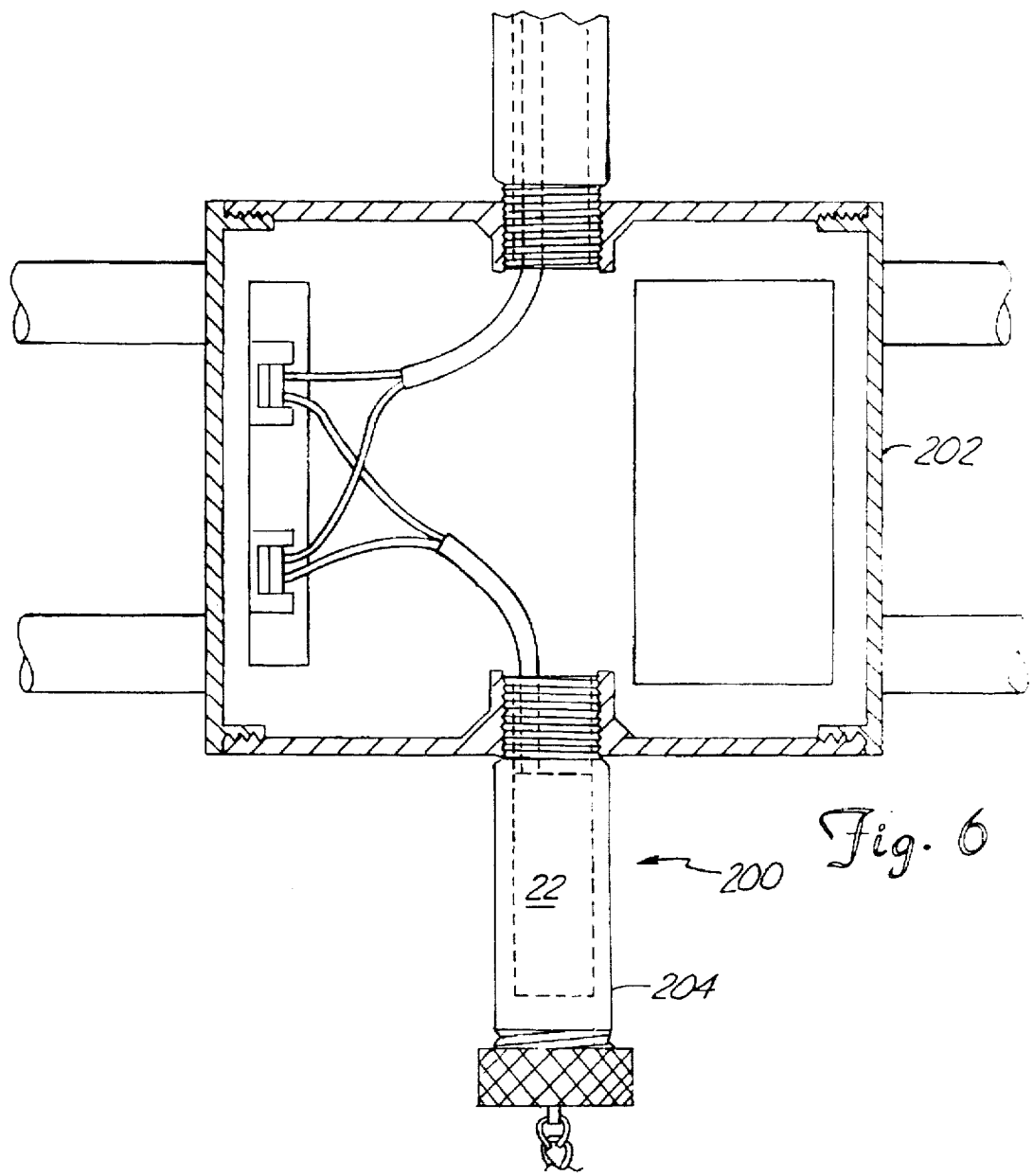
FIG. 6 is a modified sectional view of a second embodiment of the present invention, showing some electrical components in a blocked format, with a corresponding transmitter illustrated in section.

A second embodiment of a barrier device of the present invention is indicated generally in FIG. 6 at 200. Barrier device 200 is similar to barrier device 2 in that barrier circuit 22 mounts within barrier device 200 and limits power from transmitter 202. Barrier device 200 is a cylindrically shaped conduit housing 204 suitable for mounting barrier circuit 22 inside. Barrier device 200 is mounted to a transmitter 202, similar to transmitter 6, and is optionally used in place of the first embodiment of device 2 when transmitter 202 is at the end of a group of conduit-connected transmitters, or when transmitter 202 is individually connected to the controller through conduit. The former situation is illustrated by conduit 76 and other conduits such as conduit 120 illustrated in FIGS. 1 and 2, which interconnect transmitter 6 with a second transmitter (not shown), to form a communication pathway or channel for each two wire cabling, each of which individually powers a transmitter.

Figure 8:
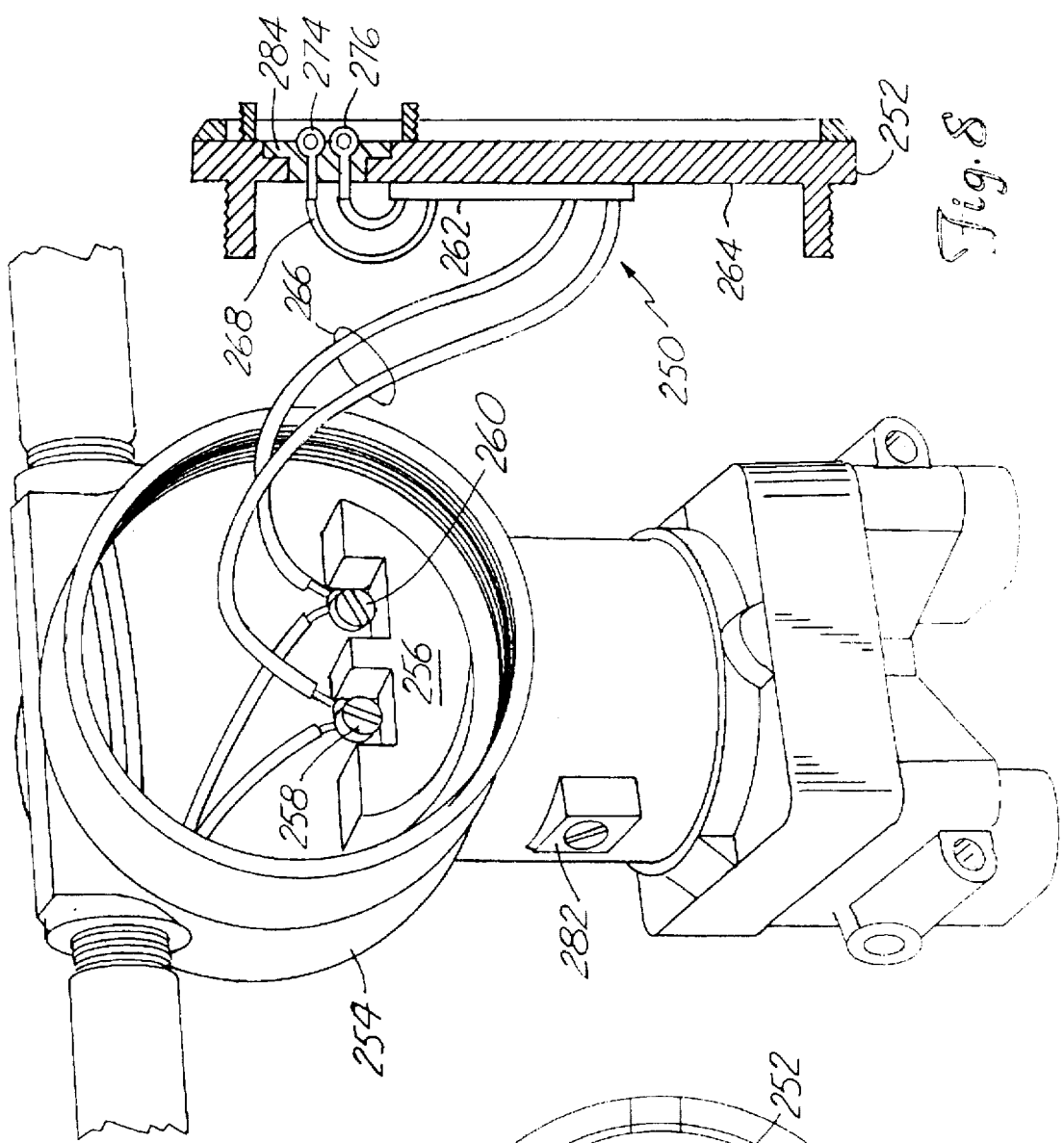
FIG. 8 is a side elevational view of a cover to the third embodiment.
Figure 7:
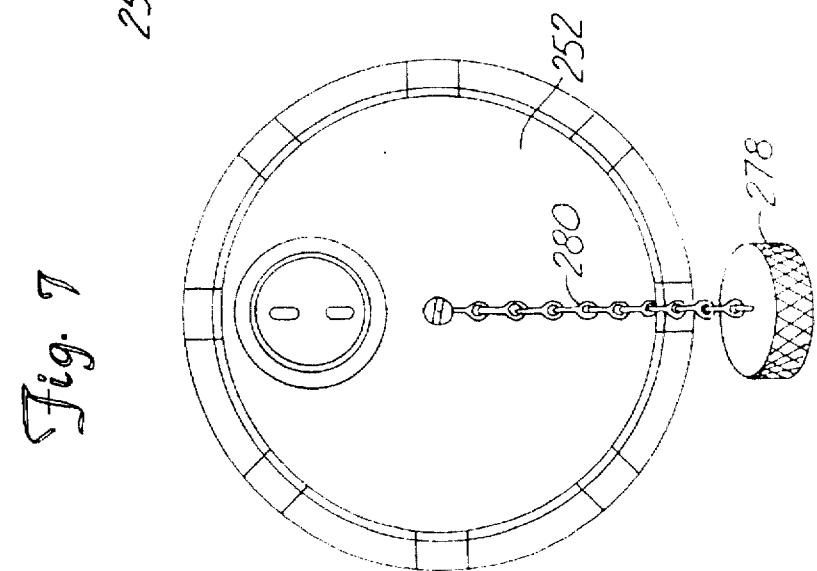
FIG. 7 is a part perspective, part sectional view of a third embodiment of the present invention.

A third embodiment of a barrier device of the present invention is illustrated in FIGS. 7 and 8. Shown generally, barrier device 250 is incorporated into a cover 252 of a transmitter 254. Cover 252 provides access to a terminal block 256 having terminals 258,260 similar to the terminals 10,12 described above. Barrier device 250 includes a barrier circuit 22 mounted to an inside surface 264 of the cover 252. In this embodiment, terminals 88 and 90 are grounded to the transmitter body, and from there to a user installed earth ground through transmitter terminal connection 282. Conductors 266 connect barrier circuit 22 to terminals 258,260 of terminal block 256. Protected electrical signals exit circuit 22 through conductors 268,270 and terminate at rings 274,276. Rings 274,276 are covered by a cap 278 threadably mated to cover 252 and connected by a chain 280. A handheld communicator connects to 5 terminals 274,276. Ring members 274,276 extend through an aperture in cover 254. In order to satisfy flameproof standards requirements, an insulator plug 284 electrically insulates ring members 274,276 from each other and is at least a half inch thick, so as to contain flames within the housing in the unlikely event of an explosion. A removable cover 278 protects signal terminals 274,276 when not in use.

A fourth embodiment of a barrier device 300 of the present invention is illustrated in FIGS. 9 and 11. In this embodiment, barrier device 300 is electrically connected between a sensor 301 and a transmitter 302 which supplies power to sensor 301 and receives a signal therefrom representing a sensed variable.

Figure 10:
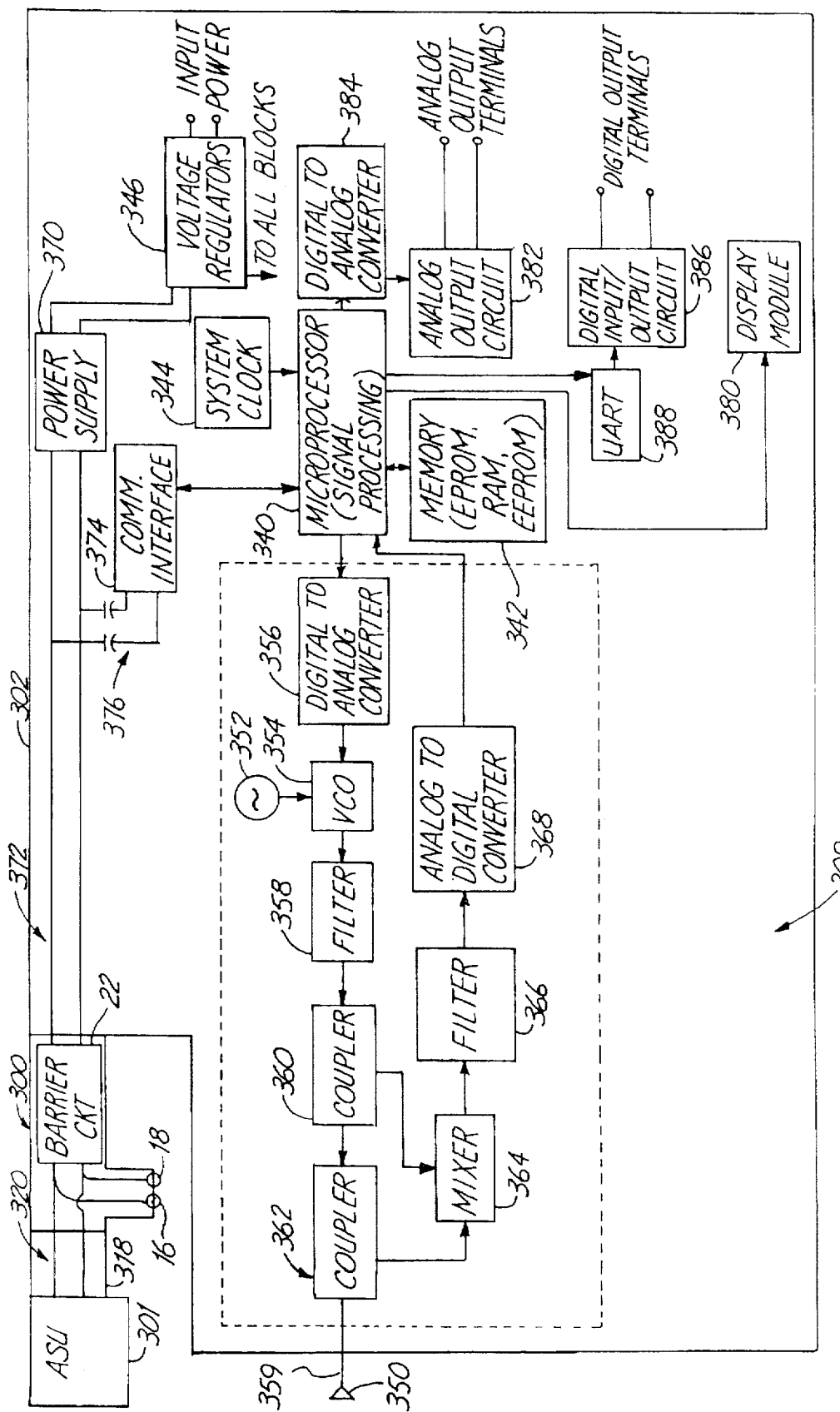
FIG. 10 is an electrical block drawing of the microwave level detecting system and the fourth embodiment of the barrier device of the present invention.

In the embodiment illustrated, sensor 301 comprises an average sensing unit (ASU) that provides a signal indicating a temperature of fluid 303 contained in a tank 305. ASU sensor 301 is a well known device and is available, for example, from Whessoe Varec, Inc. of Cypress, Calif. ASU sensor 301 includes multiple resistive elements 306 that extend into tank 305. Resistive elements 306 are each of different lengths so depending on the level of fluid 303 in tank 305 some resistive elements 306 are partially submerged, while others are completely submerged. The level of fluid 303 in tank 305 is detected by microwave level detector circuit 309 (FIG. 10). To ascertain the temperature of fluid 303 in tank 305, transmitter 302 provides a control signal to ASU sensor 301 to instruct ASU sensor 301 on which resistive element 306 to use for measuring the temperature of fluid 303. ASU sensor 301 then provides an output signal to transmitter 302 indicative of the temperature of fluid 303. Besides providing control signals to select the appropriate resistive element 306 based on the level of fluid 303 in tank 305, transmitter 302 also powers ASU sensor 301.

Upon receipt of the output signal from ASU sensor 301, transmitter 302 calculates the volume and mass of fluid 303 in tank 305 as a function of the level and temperature of fluid 303 using well known equations. Transmitter 302 transmits a signal representative of the volume and mass of fluid 303 to a remote control room 312. Communication between ASU sensor 301 and transmitter 302, and transmitter 302 and control room 312 can be either analog or digital according to known protocols or encoding schemes such as the HART® protocol.

If transmitter 301 is located in a potentially explosive atmosphere a housing 314 of transmitter 301 is made explosion proof and explosion proof conduit 316 is used to enclose signal lines to control room 312. Due to the design of ASU sensor 301, and in particular to resistive elements 306 located in tank 305, ASU sensor 301 can not be made explosion proof. Under these circumstances, barrier device 300 is coupled to transmitter 302 and a conduit 318 extending to ASU sensor 301. Barrier device 300 electrically connects transmitter 302 to ASU sensor 301, while limiting the magnitude of current through signal lines 320 (FIG. 10) and the voltage difference across signal lines 320 in order to limit the potential power available at ASU sensor 301.

Referring to FIG. 11, barrier device 300 is similar to barrier device 2 described above and has a hollow T-shaped conduit housing 322 having three threaded ends indicated at 324, 326 and 328. Barrier device 300 screws to conduit 318 at end 324 (eventually connected to the ASU sensor) and to transmitter 302 at end 326. Barrier circuit 22 mounts within a portion 330 of barrier device 300. A suitable potting material 332 secures barrier circuit 22 within portion 330.

Referring back to FIG. 4, signal lines 320 are electrically connected to barrier circuit 22 in parallel with terminals 16 and 18. As with the embodiment described above, signal terminals 16 and 18 allow convenient communication to the ASU sensor or the transmitter with a handheld communicator for periodic test or recalibration purposes.

Unlike prior art microwave level detecting systems, which have a controller (typically mounted adjacent the tank) that receives a level input from a microwave detector mounted on top of the tank and controls an ASU sensor to receive an indication of the temperature of the fluid in the tank, transmitter 320 includes elements capable of ascertaining the level of fluid 303 in tank 305, communicating and powering ASU sensor 301 as well as calculating and transmitting the volume and mass of fluid 303 in tank 305 to control room 312.

FIG. 10 is a block diagram illustrating transmitter 302. Transmitter 302 includes the known FMCW (Frequency Modulated Continuous Wave) detection circuit 309 that is controlled by a microprocessor 340 which operates according to instructions and information stored in memory 342 at a system clock rate set by clock 344. A voltage regulator 346 receives a power input and provides a regulated voltage output to the circuitry of transmitter 302.

Microprocessor 340 is coupled to an antenna 350 for measurement of the level of fluid 303 level using microwave detection circuit 309. A microwave source 352 provides microwave radiation to a voltage controlled oscillator (VCO) 354, which receives a further input from microprocessor 340 through a digital-to-analog converter 356. Typically, the frequency of microwave source 352 is between about 5.8 GHz and 30 GHz, and is preferably about 24 GHz. The output of VCO 354 is provided to waveguide 359 after passing through a filter 358 and microwave couplers 360 and 362. Microwave signals reflected off the surface of fluid 303 are received through mixer 364 which is a standard superheterodyne mixer which mixes an incoming microwave signal with the output of coupler 360, and provides a base band output to filter 366 which is digitized and provided to microprocessor 340 by analog-to-digital converter 368. In one embodiment, filter 358 is a band pass and filter 366 is a low pass filter.

As is well known in the art, in FMCW, the carrier frequency of the microwave signal is modulated. In the instant case, this is under control of microprocessor 340. Reflected signals have a phase change in the time domain which is detected by microprocessor 340 after the received signal is down converted with mixer 364 and digitized by A/D converter 368. From the output of the A/D converter 68, microprocessor 340 calculates the level of fluid 303 in tank 305.

A power supply 370 is connected to voltage regulator 346 and supplies power to ASU sensor 301 along signal lines 372, which when necessary are connected to signal lines 320 with barrier device 300. Upon calculating the level of fluid 303 in tank 305, microprocessor 340 transmits suitable control signals through a communications interface 374 to ASU sensor 301 to select the appropriate resistive element 306. Preferably, communications interface 374 is capacitively coupled to signal lines 372 with isolating capacitors 376. ASU sensor 301 returns along signal lines 372 an output signal representative of the temperature of fluid 303 in tank 305. The output signal is suitably processed by communications interface 374 and provided to microprocessor 340. Suitable instructions are stored in memory 342 to operate microprocessor 340 and calculate the volume and mass of fluid 303 in tank 305. The mass of fluid 303 in tank 305 is displayed on display 380 and provided in an analog format at the analog output of circuit 382 driven with A/D converter 384, and in a digital format at the digital output of circuit 386 driven with UART 388.

Although the present invention has been described with reference to preferred embodiments, workers skilled in the art will recognize that changes may be made in form and detail without departing from the spirit and scope of the invention. For example, the present invention works equally well with three and four wire transmitters.

What is claimed is:

1. A barrier device for mounting in the field, comprising:
   a housing with a first aperture and an open passageway extending from the first aperture to a second aperture to carry cabling to a transmitter through the first aperture;

a pair of conductors, separate from the cabling, passing through the first aperture for connecting for to a terminal block in a transmitter;

a pair of signal terminals mounted to the housing and accessible from the field, the signal terminals connectable to a handheld communicator in the field; and a barrier circuit mounted in the housing and electrically connected between the signal terminals and the conductors, where the barrier circuit allows frequency encoded signals from the communicator to access the terminal block and limits the power available at the signal terminals.

2. The barrier device of claim 1 where the housing has an extended portion, and where the signal terminals are disposed on the extended portion and the barrier circuit is mounted in the extended portion.

3. The barrier device of claim 2 where the barrier circuit is potted in the extended portion.

4. The barrier device of claim 3 where the extended portion has an inner surface, the inner surface having grooves disposed thereon.

5. The barrier device of claim 1 where a threaded cap is threadably joined to the extended portion so as to seal the signal terminals from the atmosphere.

6. The barrier device of claim 5 where the cap is removably attached to the housing by a chain.

7. The barrier device of claim 1 where the housing has a ground connection for electrically grounding the housing.

8. The barrier device of claim 1 where the barrier circuit further comprises a current limiting resistor having a first end common to one of the signal terminals.

9. The barrier device of claim 8 further comprising a zener diode, the zener diode connected between the other of the signal terminals and the second end of the current limiting resistor.

10. The barrier device of claim 8 further comprising two zener diodes each having an anode and a cathode, the anode of both zeners connected together, the cathode of one of the zeners connected to the second end of the current limiting resistor and the cathode of the other zener connected to the other of the signal terminals.

11. The barrier device of claim 10 where three sets of two zener diodes are connected between the other of the signal terminals and the second end of the current limiting resistor.

12. A field mounted measurement transmitter powered by and communicating over a current loop, the measurement transmitter comprising:

a housing;

an A/D converter for converting a sensed process variable into a digitized process signal;

a microprocessor for compensating the digitized process signal;

an output circuit having a pair of process terminals within the transmitter for coupling the compensated digitized process signal to the current loop;

a barrier circuit disposed in the housing electrically connected to the process terminals; and a pair of signal terminals mounted to the housing and accessible from the field, the signal terminals connectable to a communicator for receiving frequency encoded signals therefrom, the signal terminals electrically connected to the barrier circuit, where the barrier circuit limits the amount of power available at the signal terminals.

13. A field mountable measurement transmitter for sensing a level of a fluid in a tank and providing power to and communicating with a temperature sensor sensing a temperature of the fluid in the tank, the measurement transmitter comprising:

a housing;

a measurement circuit for measuring the level of the fluid;

a first output circuit for powering the temperature sensor and receiving a sensor signal representative of the temperature of the fluid;

a microprocessor coupled to the measurement circuit for receiving a first signal representative of the level of the fluid and coupled to the output circuit for receiving the sensor signal, where the microprocessor calculates a value of a selected parameter of the fluid as a function of a value of the first signal and a value of the sensor signal;

a second output circuit coupled to the microprocessor for transmitting all output signal representative of the value of the selected parameter; and a barrier device comprising:
a second housing with a first and a second aperture;
a pair of conductors passing through the first aperture, for connecting to the first output circuit;
a pair of signal terminals mounted in the second aperture and accessible from the field, the signal terminals connectable to a handheld communicator in the field;
pair of signal lines extending out the second aperture and electrically connected to the temperature sensor; and
a barrier circuit mounted in the second housing and electrically connected between the signal terminals and the conductors, and electrically connected between the pair of signal lines and the conductors, where the barrier circuit allows frequency encoded signals from the communicator to access the output circuit and limits the power available at the signal terminals and through the pair of signal lines.

14. A field mountable transmitter in a process control loop, comprising:

a sensor for sensing a process variable;

a transmitter housing having a first threaded aperture and a second threaded aperture joinable to conduit;

a conduit joined to the first threaded aperture for carrying conductors of the process control loop;

an input circuit disposed in the transmitter housing for receiving an input signal indicative of the process variable;

an output circuit disposed in the transmitter housing having process terminals electrically connected to the conductors of the process control loop for communicating information to a remote location and for receiving power; and a barrier device comprising:
a housing joined to the second threaded aperture;
a pair of signal terminals mounted to the housing and accessible from the field, the signal terminals being connectable to a handheld communicator in the field; and
a barrier circuit mounted in the housing and electrically connected between the signal terminals and the process terminals, where the barrier circuit allows frequency encoded signals from the communicator to access the terminal block and limits the power available at the signal terminals.

15. The transmitter of claim 14 wherein the housing of the barrier device includes a passageway for carrying conductors of the process loop to the transmitter.

16. The transmitter of claim 14 where the housing of the barrier device is stub shaped and one end of stub is joined the second aperture, and wherein the signal terminals are disposed at the other end.

17. The transmitter of claim 16 where the barrier circuit is potted in the housing.

18. The transmitter of claim 16 where the housing has a ground connection for electrically grounding the housing.

19. A field mountable transmitter in a process control loop, comprising:

a sensor for sensing a process variable;

a transmitter housing having a first threaded aperture joinable to conduit, and a second threaded aperture;

a conduit joined to the first threaded aperture for carrying conductors of the process control loop from a remote location;

an input circuit disposed in the transmitter housing for receiving an input signal indicative of the process variable;

an output circuit disposed in the transmitter housing having process terminals accessible through the second threaded aperture, the process terminals electrically connected to the conductors of the process control loop for communicating information to the remote location and for receiving power; and a cover joined to the second threaded aperture;

a pair of signal terminals mounted to the cover and being accessible from the field with the cover joined to the second threaded aperture, the signal terminals being connectable to a handheld communicator in the field; and a barrier circuit electrically connected between the signal terminals and the process terminals, where the barrier circuit allows frequency encoded signals from the communicator to access the process terminals and limits the power available at the signal terminals.

20. The transmitter of claim 19 wherein the barrier circuit is mounted to the cover.

* * * * *

UNITED STATES PATENT AND TRADEMARK OFFICE
CERTIFICATE OF CORRECTION

PATENT NO.   : 5,710,552
DATED        : January 20, 1998
INVENTOR(S)  : McCoy et al.

It is certified that error appears in the above-indentified patent and that said Letters Patent is hereby corrected as shown below:

Column 9, line 2, cancel "for" (2nd occurrence)

Column 10, line 17, replace "all" with --an--.

Signed and Sealed this

Twenty-first Day of April, 1998

Attest:

BRUCE LEHMAN

*Attesting Officer*     *Commissioner of Patents and Trademarks*